United States Patent
Townsend

(10) Patent No.: US 8,483,391 B2
(45) Date of Patent: Jul. 9, 2013

(54) OPTICAL COMMUNICATION SYSTEM AND METHOD FOR SECURE DATA COMMUNICATION USING QUANTUM KEY DISTRIBUTION

(75) Inventor: Paul Townsend, Classes Lake (IE)

(73) Assignee: University College Cork, National University of Ireland, Cork, Cork (IE)

( * ) Notice: Subject to any disclaimer, the term of this patent is extended or adjusted under 35 U.S.C. 154(b) by 305 days.

(21) Appl. No.: 12/922,196

(22) PCT Filed: Mar. 13, 2009

(86) PCT No.: PCT/EP2009/001870
§ 371 (c)(1),
(2), (4) Date: Sep. 13, 2010

(87) PCT Pub. No.: WO2009/112286
PCT Pub. Date: Sep. 17, 2009

(65) Prior Publication Data
US 2011/0019823 A1    Jan. 27, 2011

(30) Foreign Application Priority Data
Mar. 13, 2008 (EP) .................................. 08394008
Mar. 13, 2008 (IE) .................................. 2008/0186

(51) Int. Cl.
*H04L 29/06* (2006.01)
*H04L 9/12* (2006.01)

(52) U.S. Cl.
USPC .......................................... 380/256; 380/278

(58) Field of Classification Search
None
See application file for complete search history.

(56) References Cited

U.S. PATENT DOCUMENTS

| 5,768,378 A | 6/1998 | Townsend et al. |
| 7,248,695 B1 | 7/2007 | Beal et al. |
| 2006/0198521 A1 | 9/2006 | Young et al. |

FOREIGN PATENT DOCUMENTS

EP    1633076    3/2006

*Primary Examiner* — Gilberto Barron, Jr.
*Assistant Examiner* — David Le
(74) *Attorney, Agent, or Firm* — Occhiuti Rohlicek & Tsao LLP

(57) ABSTRACT

The invention provides time-synchronised transmission of data on the (polarisation or phase-modulated) QKD channel and the (on-off modulated) conventional channel such that a QKD bit is only transmitted when a zero, or sequence of zeros, is transmitted on the conventional channel. Also, there is co-directional propagation of the QKD and conventional channel. Further, there is dispersion management through wavelength selection or control of fibre properties or other means such that the "walk-off in time of the QKD pulses and the Raman pulses generated by the ones on the conventional channel is less than or of the order of one bit period. The latter can be achieved, for example, by placing the conventional and QKD channel wavelengths close to the point where the group velocity-induced time delay for optical pulses propagating in the fibre reaches a minimum. This dispersion minimum occurs at a wavelength of 1.3 microns in standard fibre. The invention discloses a receiver embodiment to implement the invention.

17 Claims, 8 Drawing Sheets

Time-resolved photocount distribution in 1290nm QKD channel (QKD channel off). Counts are generated by spontaneous Raman scattering of the 1310nm conventional channel. The count rate is minimum at the data zero positions.

Time-resolved photocount distribution in 1290nm QKD channel (QKD channel on). Raman cross-talk with the QKD channel is minimised at the data zero positions.

OPTICAL COMMUNICATION SYSTEM AND METHOD FOR SECURE DATA COMMUNICATION USING QUANTUM KEY DISTRIBUTION

CROSS-REFERENCE TO RELATED APPLICATIONS

This application is the National Stage of International Application No. PCT/EP2009/001870, filed on Mar. 13, 2009, which claims the priority date of European Application No. 08394008.0, filed on Mar. 13, 2008 and Irish Application No. 2008/0186, filed on Mar. 13, 2008 the contents of both being hereby incorporated by reference in their entirety.

FIELD OF THE INVENTION

The invention relates to quantum cryptography for use in a communication system. In particular the invention relates to a quantum cryptography system and method for data to be transmitted over a communication system that minimises/eliminates cross talk generated by Raman scattering.

BACKGROUND TO THE INVENTION

Quantum cryptography, or quantum key distribution (QKD) as it is more accurately known, exploits fundamental quantum properties of single photons of light in order to guarantee the security of information transmitted over optical communication networks. The technique was disclosed by IBM in the mid-1980s and has since been the subject of much research activity which has recently culminated in the first commercial QKD product releases (see, for example, www.idquantique.com and www.magiqtech.com). To date, most research and development in the QKD area has focused on applications over intermediate reach ($\geq 100$ km), point-to-point fibre links with the general goals of increasing both the distance and bit rates supported by the QKD system. In contrast, the possibility of exploiting QKD to protect smaller-scale (~10 km), fibre-to-the-home/business (FTTx) access networks has received comparatively less attention since the original concept demonstration.

FTTx has been envisaged for a long time as an attractive future access technology for delivering high bandwidths to customers. However, until recently the development and widespread deployment of copper-based broadband solutions such as digital subscriber line and cable modem had slowed down its introduction. Now, demand for new high bandwidth services such as interne protocol (IP) television and video on demand, as well as changing competitive and regulatory forces, are beginning to drive the deployment of fibre access networks around the world, "Driving Fibre Closer to the home", K. Twist, Nature Photonics, Vol. 1, 149-150. Japan is the current world leader with more than 10 million FTTx customers, but significant deployments are also underway in the USA, Korea and, more recently, in Europe. One of the most attractive optical access network architectures is the passive optical network (PON), which is highly cost-effective because the network infrastructure is c hared by many customers and has no active components, such as electronic switches or routers, in the path between the telecommunication provider's central office or local exchange and the customer. The first generations of PONs are now standardised and commercially available, the most advanced PONs typically offer 2.5 Gbit/s or 1 Gbit/s on the downstream channel (1490 or 1550 nm wavelength) and ~1 Gbit/s on the upstream channel (1310 nm wavelength). This available bandwidth is shared via passive optical splitters and a time-division multiple access (TDMA) protocol, over a reach of around 10 km.

In order to be cost-effective, QKD channels must typically operate over the same fibre infrastructure as conventional optical communication channels. These conventional channels may carry ordinary unencrypted data, data that is encrypted using the keys exchanged on the QKD channel, timing and control information that is required for operation of the QKD channel, or a combination of the above. U.S. Pat. No. 5,675,648, assigned to British Telecom, describes this combined conventional/quantum channel transmission.

U.S. Pat. No. 5,768,378, assigned to British Telecom, describes a QKD implementation on an example (multi-user PON) fibre network infrastructure. However, QKD employs (at most) a single photon per bit of transmitted information; a value that is approximately 7-8 orders of magnitude lower than for a typical conventional optical communication system. The main problem with this implementation is that cross-talk from conventional data channels operating over the network can easily prevent effective operation of the QKD channel unless suitable complex cross-talk mitigation schemes are employed. This is particularly relevant in multi-channel, wavelength-division-multiplexed (WDM) systems where the cross-talk is dominated by Raman scattering present. The latter converts a proportion of the photons from each conventional data channel to new wavelengths, spread over a wide (~300 nm) range centred on the original channel wavelength. If these Raman photons lie within the wavelength band allocated to the QKD channel then cross-talk will occur. The level of cross-talk, its impact on the performance of the QKD system and the problems associated with Raman scattering is described in detail in the paper "Backscattering limitation for fiber-optic quantum key distribution systems" by Subacius, D.; Zavriyev, A.; Trifonov, A., Applied Physics Letters 86, 011103 (2005).

Two main approaches to system design have been employed previously to reduce Raman cross-talk is as follows:

QKD Channel Out of Raman Band

The QKD channel wavelength $\lambda_{QKD}$ is chosen to lie outside of the Raman bands of the conventional channels. A relatively low-cost, broad-band, conventional optical filter can then be used to block the Raman photons from entering the QKD receiver. Such an approach is described in the paper "Experimental characterization of the separation between wavelength-multiplexed quantum and classical communication channels", Nweke, N. I.; Toliver, P.; Runser, R. J.; McNown, S. R.; Khurgin, J. B.; Chapuran, T. E.; Goodman, M. S.; Hughes, R. J.; Peterson, C. G.; McCabe, K.; Nordholt, J. E.; Tyagi, K.; Hiskett, P.; Dallmann, N., Applied Physics letters 87, 174103 (2005) published on Oct. 21, 2005. This scheme is illustrated in FIG. 1, which shows a schematic diagram of the optical spectrum at the output of an optical fibre carrying a high intensity, conventional data channel (1) and a low intensity, quantum key distribution channel (QKD) (3). Spontaneous Raman scattering in the fibre converts a proportion of the photons from the conventional channel to new frequencies resulting in a broad spectral 'pedestal' (2). A filter with an appropriate broad passband (4) can then be used to isolate the QKD channel from the conventional channel and its Raman background.

QKD Channel In Raman Band

In many optical communication systems, wavelength division multiplexing (WDM) techniques are employed to allow a single fibre to support multiple conventional data channels. This situation is illustrated schematically in FIG. 2 where an additional data channel (5) and associated Raman scattering (6) are shown in the output spectrum. In this case there is no Raman-free region of the spectrum and the QKD channel must operate in the presence of a significant level of Raman-induced cross-talk from the conventional channel (5). Without mitigation this cross-talk would generate significant errors in the QKD channel thus preventing secure operation. In practice, the conventional data channels may be closely spaced (a typical frequency separation is 100 GHz) and large in number (64 or more) so that the Raman spectra of multiple channels overlap at $\lambda_{QKD}$. Nevertheless, it may still be possible operate the QKD channel if a specifically-tailored, narrow band-pass optical notch filter centred on $\lambda_{QKD}$ with very high out-of-band blocking is used to suppress a large fraction of the Raman scattering. Such an arrangement is described in U.S. Pat. No. 7,248,695, Beal et al. This is effective because of the broad bandwidth of the Raman scattering when compared with a typical QKD channel bandwidth (<1 nm), but nevertheless some Raman photons will still reach the QKD detector. In core or metro networks, the cost of the optical communication system is effectively shared across many customers, but in an access PON there is no cost-sharing of the customer-end optical system and it is critical, therefore, that component costs are as low as possible. The scheme of U.S. Pat. No. 7,248,695 uses a non-standard narrow-band filtering scheme in which either filters or quantum channel source or both would require accurate temperature control and wavelength locking in order that the source and filter wavelengths remain matched as the temperature varies. This would be impractical to implement in an access PON where, depending on the location of the quantum channel receiver, each customer would require either an expensive temperature controlled, high specification, non-standard notch filter or an expensive temperature controlled photon source.

Other systems that describe QKD implementations are described in EP 1 633 076, Nippon Electric Co., and US 2006/198521, Young et al. EP 1 633 076 discloses a system where a quantum channel and a classical channel are multiplexed with multiplexer and demultiplexer on a single optical transmission line and information is transmitted from a transmitter to a receiver through the quantum channel, the classical channel is inhibited from affecting the quantum channel. EP 1 633 076 primarily teaches an optimised filtering scheme and power control to reduce the mean power of the classical conventional channel when the quantum channel is on.

US 2006/198521 discloses a method of synchronizing the operation of a two-way QKD system by sending a sync signal (SC) in only one direction, namely from one QKD station to another QKD station. The one-way transmission greatly reduces the amount of light scattering as compared to two-way sync signal transmission. The method includes phase-locking the sync signal at the first QKD station and dithering the timing of the quantum signals so as to operate the QKD system in three different operating states. The number of detected quantum signals is counted for each state for a given number of detector gating signals. The QKD system is then operated in the state associated with the greatest number of detected quantum signals. This method is rapidly repeated during the operation of the QKD system to compensate for timing errors to maintain the system at or near its optimum operating state. The method allows for only having to adjust the timing of a single timed element-namely, the quantum laser-to compensate for timing variations, rather than having to adjust the timing of all or some of the timed elements in the QKD system. The method disclosed is not directed to Raman suppression.

However, these approaches suffer from two main problems. First, in some network applications the out of band approach cannot be employed because no Raman-free wavelength windows exist for conventional channels operating in the 1250 to 1700 nm spectral region. Secondly, for the in band approach the notch filter is expensive to implement as narrow band-pass filters with high out of band blocking are costly to manufacture and both the filters and QKD optical source will require temperature control in order that the wavelengths remain precisely matched.

There is therefore a need to provide a quantum cryptography system and method to overcome the above mentioned problems.

SUMMARY OF THE INVENTION

According to the invention, there is provided as set out in the appended claims, an optical communication system for secure data communication using quantum key distribution (QKD), comprising:
  a QKD data channel;
  a conventional data channel;
  a transmitter comprising means for transmitting data on said QKD data channel and said conventional data channel; characterised in that
  the transmitter performs time synchronisation to transmit a QKD data bit(s) on said QKD channel only when a zero or sequence of zeros is detected on the conventional data channel.

The invention makes use of the fact that under certain network operating conditions, for example in a Passive Optical Network (PON), the Raman cross-talk interference present can become strongly modulated, showing approximately the same temporal structure as the conventional data channel. The invention provides time-synchronised transmission of data on the (polarisation or phase-modulated) QKD channel and the (on-off modulated) conventional channel such that a QKD bit is only transmitted when a zero, or sequence of zeros, is transmitted on the conventional channel. Since the QKD data bits transmitted only coincide with zeros on the conventional channel the instantaneous cross-talk is minimised and can be reduced to an arbitrarily small level by increasing the on-off modulation extinction ratio of the conventional channel optical source. The depth or level of Raman depends on the modulation extinction ratio of the conventional channel laser. The required extinction ratio will depend on the amount of Raman which depends on factors such as fibre length, conventional laser power, number of conventional channels and separation of quantum and conventional channel wavelengths The current invention solves these problems outlined above effectively by employing time-domain filtering, which relaxes the specifications required for the spectral filters in the system. Hence, it may be possible to use standard, wide-band filters such as CWDM filters, where the quantum source wavelength stays confined within the filter pass-band over the full operating temperature range. Hence the temperature of the source does not need to be controlled, which reduces cost. Unlike the special notch filters of U.S. Pat. No. 7,248,695, CWDM filters are standardised and sold in high volumes for use in conventional communication system applications and hence are relatively low cost. A further advantage follows, which is that the spectral width of the quantum source can be wider and is not constrained by the width of the notch filter as in U.S. Pat. No. 7,248,695. This allows a wider range of potential quantum channel sources to be used in the system, giving further opportunities for cost or performance optimisation.

In one embodiment the transmitter comprises means for controlling alignment of bits in the conventional data channel and the QKD channel.

In one embodiment there is provided means for controlling the alignment comprises a common clock for the QKD and conventional data channels, said clock introduces time delays before transmission to guarantee bit alignment between the QKD and conventional data bits.

In one embodiment, the bursts of conventional and QKD data generated by a given user are bit-synchronous, but bursts generated by different users are not bit-synchronous with respect to each other. The timing scheme for the conventional upstream channel in a PON which would then also apply for the QKD system. In a PON, a time division multiple access scheme is used in the upstream direction so that different customers have access to the channel at different times and only one customer can transmit at any given instant. A timing and ranging protocol is used to ensure that the bursts of data generated by the different customers do not overlap in time when they come together at the network splitter. It will be appreciated that a PON is a tree like network with a branching point where downstream signals are split onto multiple fibres and upstream signals are combined onto a single fibre. This timing scheme does not require or guarantee that bursts from different customers are bit-aligned or synchronised, instead the bursts just occupy separate timeslots with guard bands between to prevent any overlap.

The Raman suppression scheme according to the invention requires bit alignment between the quantum and conventional upstream data channels. A single Customer in a PON only sends quantum data when sending conventional upstream data. During that period in time no other customers are transmitting, so the only Raman cross-talk is self-induced. The Customer can use a common clock for his quantum and conventional data and hence bit synchronisation is achieved.

In one embodiment the system comprises means for increasing the on-off modulation extinction ratio of the conventional channel. The depth or level of Raman depends on the modulation extinction ratio of a conventional channel laser. Direct on-off modulation of a laser is achieved by modulating the drive current of the laser between pre-determined high and low levels, which set the output optical powers for the one (on) and zero (off) states, respectively. Under normal operating conditions the ratio of the one and zero power levels would be in the range 5-10 dB, which is referred to as the modulation extinction ratio. It is possible to increase this extinction ratio to an arbitrarily large value by reducing the zero level current closer to, or even below the threshold current of the laser. In experiments performed it is possible to increase to ~25-30 dB for example.

In another embodiment, the transmitter transmits the channels co-directionally. It is this that causes the Raman to be temporally modulated. In contrast, when the channels counter propagate, Raman photons generated by a given classical pulse at different points in the fibre will experience different propagation times to the QKD receiver and hence will arrive at different times so no specific temporal gap or hole is created.

In a further embodiment, the system has optical characteristics such that walk-off in time of the QKD and conventional data channels is less than or of the order of one conventional channel bit period.

In one embodiment, a waveguide controls the transmission wavelength to set the wavelength at or close to a minimum for a group delay vs. wavelength characteristic curve for the waveguide.

In another embodiment, dispersion compensation components or systems are employed to reduce walk-off to the required level.

In a further embodiment, the wavelength is in the range of 1.2 to 1.65 µm. It has been found that for systems operating close to zero dispersion wavelength in fibre is optimal for development and maintenance of temporal gap over long fibre lengths. Zero dispersion wavelength is at 1300 nm in standard fibre, but can for example be in 1550 nm range for 'dispersion shifted' fibres which are used in some long distance fibre links. The inventors found that by selecting the wavelength of lower dispersion ensures that 'window' with temporal gaps or holes of Raman are obtained that allows for effective operation of the invention. A particularly suitable wavelength for operation is 1.3 µm.

In one embodiment, the system comprises coarse wavelength division multiplexers and de-multiplexers and/or other optical filters.

In another embodiment, the system is a multi-user passive optical network.

In a further embodiment, the users share the available network capacity by employing a time-division-multiple-access protocol such that the QKD and conventional channels transmitted by each user operate in burst-mode.

In a further embodiment of the invention there is provided an optical communication system for secure data communication using quantum key distribution (QKD), comprising:
  a QKD data channel;
  a conventional data channel;
  a receiver comprising means for receiving data from said QKD data channel and said conventional data channel using a waveguide; characterised in that
  the receiver performs time synchronisation to receive data bits from said QKD channel and said conventional data channel, such that quantum channel bits are only detected by bit periods only when there is a zero or zeros on the conventional channel, wherein cross-talk interference caused by Raman scattering is minimised.

In another embodiment of the invention there is provided a method of using quantum key distribution (QKD) for secure data communication in a communication system, comprising the steps of:
  providing a QKD data channel;
  providing a conventional data channel;
  transmitting data on said QKD data channel and said conventional data channel;
  characterised by the step of:
  performing time synchronisation to transmit a QKD data bit(s) on said QKD channel only when a zero or sequence of zeros is detected on the conventional data channel, such that cross-talk interference caused by Raman scattering is minimised.

In a further embodiment there is provided method of using quantum key distribution (QKD) for secure data communication in a communication system, comprising the steps of:
  providing a QKD data channel;
  providing a conventional data channel;
  receiving data from said QKD data channel and said conventional data channel using a waveguide; characterised by the steps of:
  performing time synchronisation to receive data bits from said QKD channel and said conventional data channel, such that quantum channel bits are only detected by bit periods only when there is a zero or zeros on the conventional channel, wherein cross-talk interference caused by Raman scattering is minimised.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of some embodiments thereof, given by way of example only with reference to the accompanying drawings in which:

FIG. 8 illustrates results from a single photon detection scheme showing photocounts with QC source on;

DETAILED DESCRIPTION OF THE DRAWINGS

Figure 1:
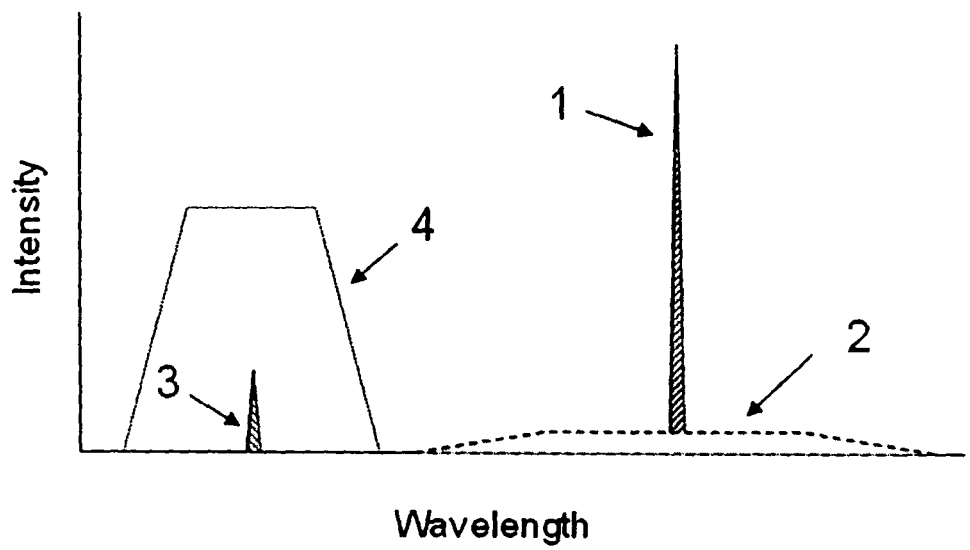
FIGS. 1 and 2 are diagrams concerning the prior art, as set out above.
Figure 2:
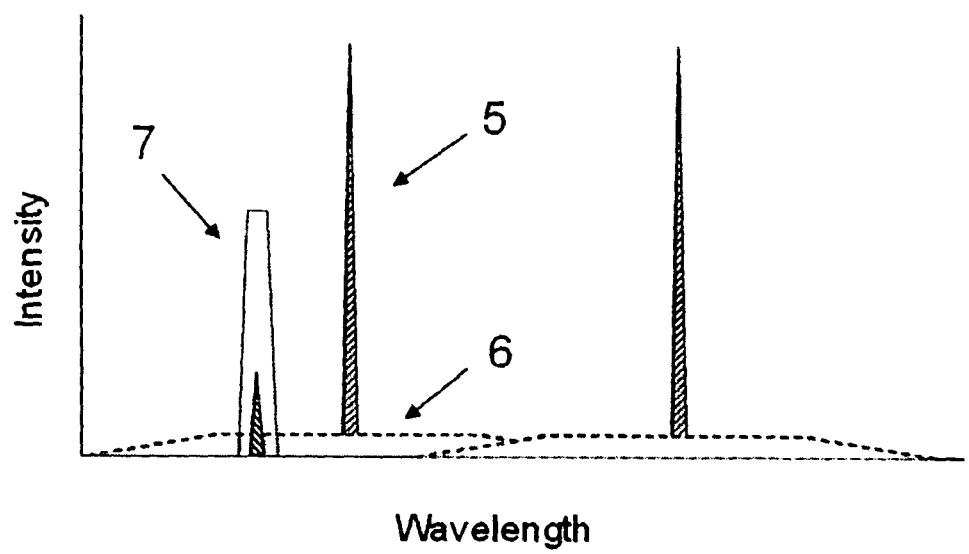
Figure 3:
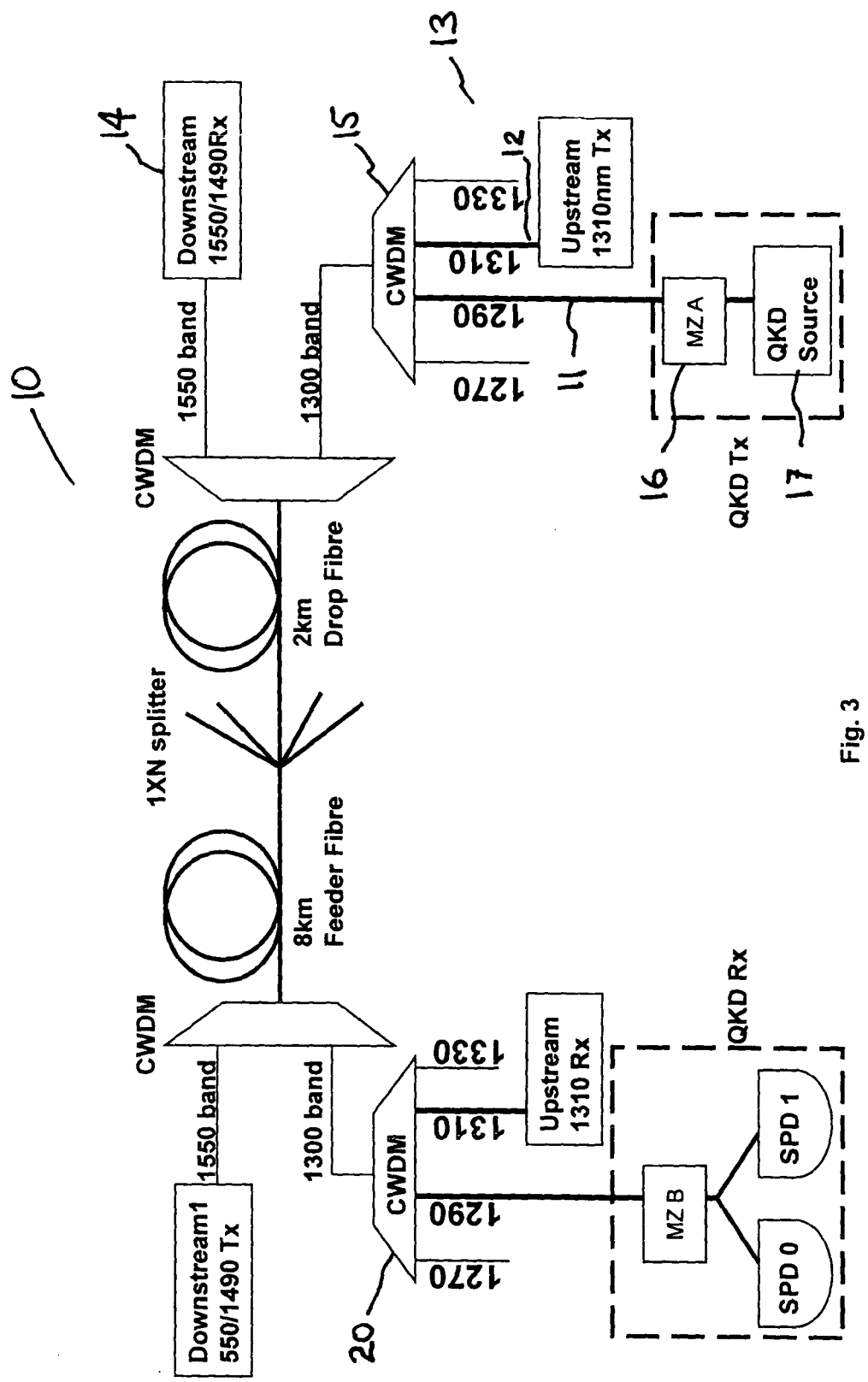
FIG. 3 is a diagram of a system of the invention.

Referring now to the figures, FIG. 3 shows an implementation for Quantum Key Distribution in a Passive Optical Network with new Raman suppression according to the invention, indicated generally by the reference numeral (10). One end-user out of possible 32 is shown on the right hand side of the diagram. An upstream QKD channel 11 and a conventional data channel (12) at a transmitter end (13) operate in the 1300 nm band at 1290 nm and 1310 nm respectively. The channels (11) and (12) are time synchronised with respect to each other. FIG. 3 also provides two other unused channels at 1270 nm and 1330 nm that are currently unpopulated and can be used for additional upstream channels, if required. A conventional downstream channel (14) operates at either 1490 or 1550 nm wavelength, or both. At the transmitter end (13) there is provided a coarse wavelength division multiplexer (CWDM) (15) that multiplexes the channels (11) and (12) for onward transmission. It will be appreciated that using CWDM may not be best solution for all applications. For example it depends on how much suppression is required from the filters. CWDM is however preferred for low cost as the filters are wide enough (20 nm between channels) that lasers do not require temperature stabilisation. That is to say, as the temperature changes the laser wavelength will change but not sufficiently to move outside the filter band (applies to standardised temperature range, for example 0 to 70 degrees C. for a commercial transceiver. The QKD data channel (11) is connected to a MZ phase modulator and/or interferometers 16 for encoding QKD data prior to transmission and a QKD source (17) for supplying data to be encoded. A transmitter end receives the multiplexed channels (11) and (12) and are de-multiplexed by coarse wavelength division multiplexer (CWDM) (20).

Also, there is co-directional propagation of the QKD and conventional channels, as defined above.

Figure 4:
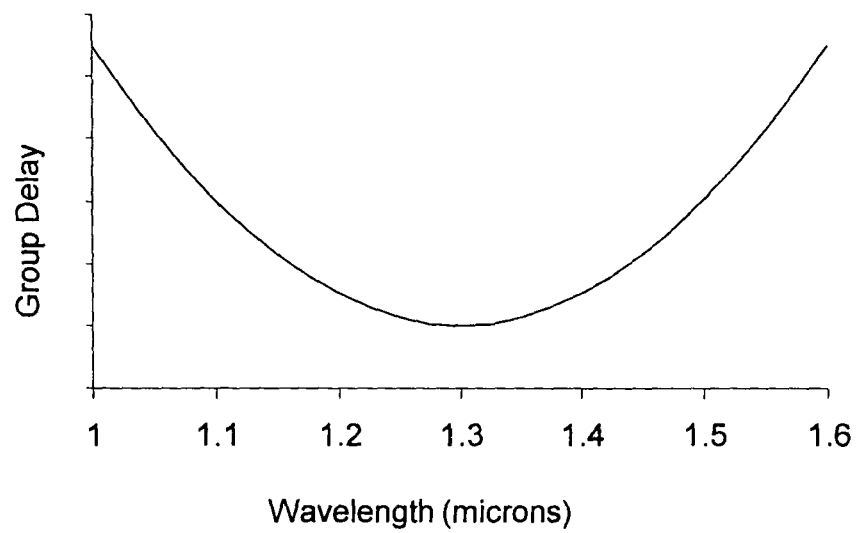
FIG. 4 is a plot illustrating how a fibre is chosen.

An important aspect of the invention provides wavelength dispersion management through wavelength selection or control of fibre properties or other means such that the 'walk-off' in time of QKD pulses generated by the QKD channel and the Raman pulses generated by the ones on the conventional channel is less than or of the order of one bit period. The latter can be achieved, for example, by selecting the conventional and QKD channel wavelengths close to the point where the group velocity-induced time delay for optical pulses propagating in the fibre reaches a minimum. It was found, as shown in FIG. 4, this dispersion minimum occurs at a wavelength of 1.3 microns (or 1300 nm) in standard fibre.

Figure 5:
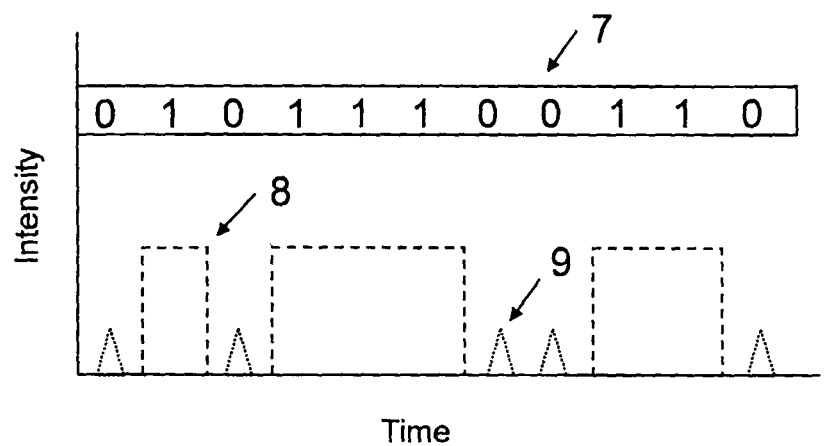
FIG. 5 is a diagrammatic plot illustrating optical communication of the invention.

As illustrated in FIG. 5, under these conditions the Raman cross-talk (8) becomes strongly modulated, showing the approximately same temporal structure as the conventional data pattern (7). The QKD data bits (9) are only transmitted to coincide with zeros on the conventional channel such that the instantaneous cross-talk is minimised or eliminated. In practice and in the context of the present invention it is desirable to reduce to a level that is low compared with other sources of noise i.e. single photon detector dark counts. To reduce further would have little benefit for the QKD, but could begin to impact the performance of the conventional channel as it would be achieved by increasing the extinction ratio. For example, the Raman crosstalk can be reduced to an arbitrarily small level by increasing the on-off modulation extinction ratio of the conventional channel optical source. It will be appreciated that the WDM filters used in the system to combine and separate the QKD and conventional channels will typically be narrower than the Raman band and hence will also contribute to suppression of the cross-talk. However, specifically-tailored narrow notch filters with high out of band blocking will not be required.

The system allows operation of QKD on networks where Raman scattering occurs across all available wavelength windows and also enables the use of low cost optical filter technology. In particular the system and method of the invention enables QKD to be readily implemented on multi-user, optical access networks using standardised wavelength allocation plans. In the present invention the QKD system can be used to prevent unauthorised access to services offered on the network.

Figure 6:
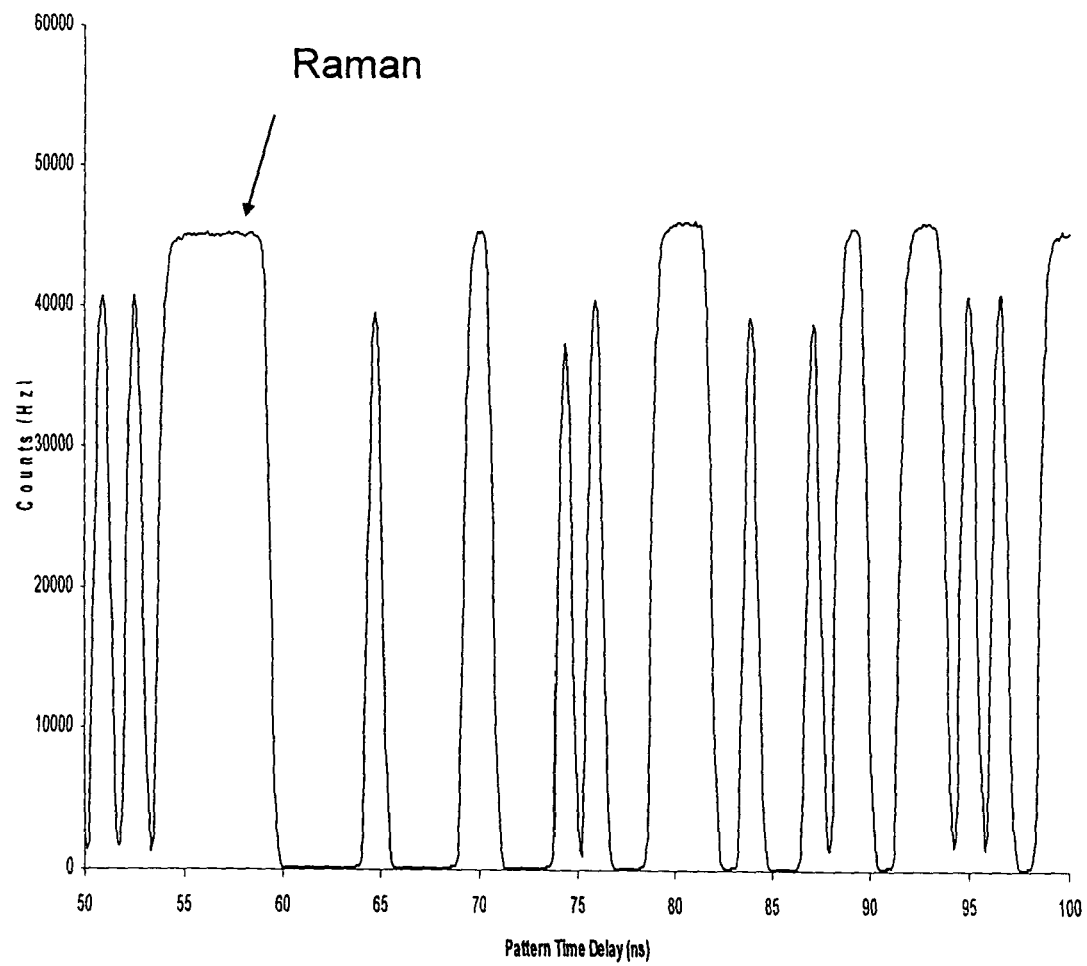
FIGS. 6 and 7 are more detailed plots, illustrating experimental verification of the diagrammatic plot of FIG. 5.
Figure 7:
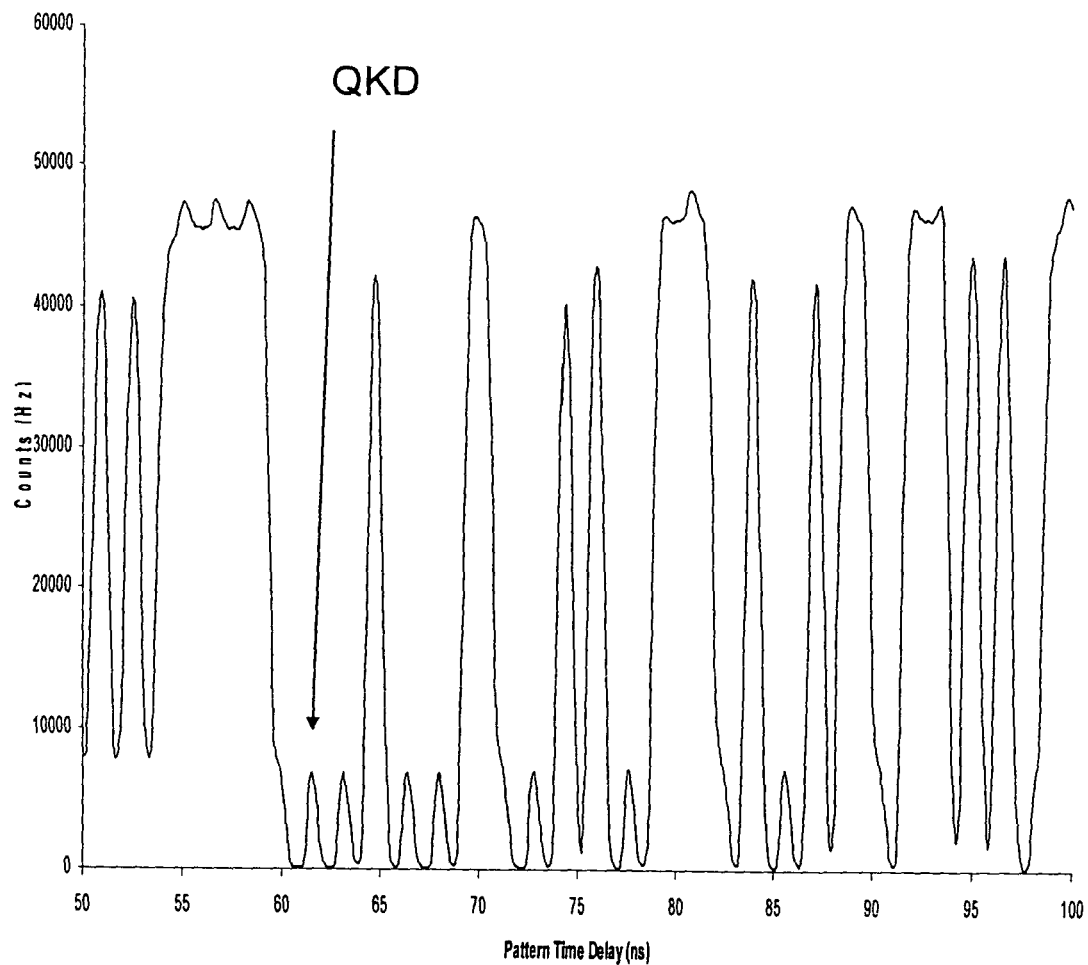

FIGS. 6 and 7 show the photocounts in the 1290 nm QKD channel that are generated by Raman scattering from the conventional 1310 nm upstream data channel as a function of time delay, in detail. The Raman cross-talk is strongly modulated and matches the upstream data pattern. In particular the Raman count can reach the background level set by single photon detector noise whenever a zero is transmitted on the conventional upstream channel. In operation these temporal 'windows' in the Raman count are used for sending QKD data with low cross-talk induced errors.

Figure 8:
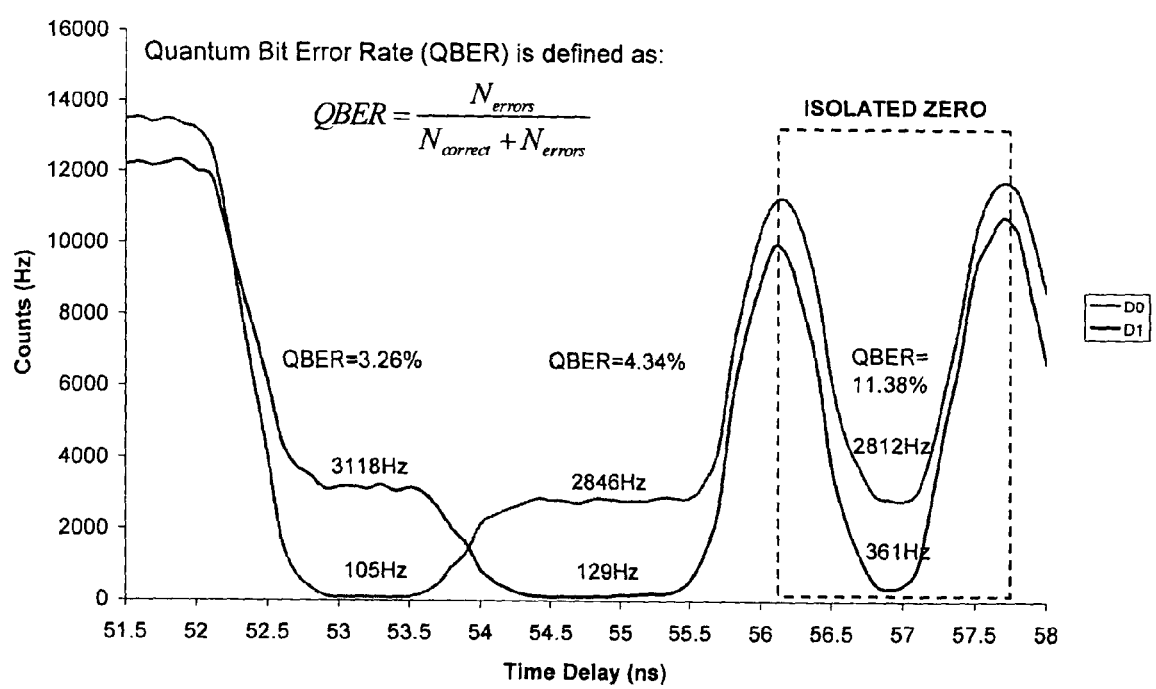

FIG. 8. Illustrates results from a single photon detection scheme showing photocounts with QC source on (expanded view of time region shown by dotted box in FIG. 8). A quantum channel 'zero' detector and a quantum channel 'one' detector is shown. The QBER value is low enough (<11%) for secure key distribution to be achieved whenever there are two or more consecutive zeroes on the conventional data channel. With improvement in detector time response the isolated zero positions can also be employed for key distribution in a QKD system. In the case shown in FIG. 8, the single photon detector time-resolution can be comparable to the bit period, which limited the depth of the 'Raman hole' and hence the suppression effect. However, for longer sequences of consecutive zeros the detector time resolution is sufficient to generate a deep Raman hole and hence the crosstalk suppression is more effective and the quantum channel error rate lower. Use of single photon detectors with improved time resolution eliminates this problem. High speed single photon detection scheme novel electronic gating and discriminations schemes are possible, which allow the operating frequency of infrared single photon detectors to be increased from the few MHz possible with today's commercial products into the GHz range. In the context of a GPON this would allow a QC channel to operate with the same clock frequency as the conventional channel; dramatically increasing the key distribution rate. The invention provides alternative high speed gating and discrimination schemes optimised for the PON application. In particular, these schemes will need to operate in asynchronous burst-mode as the QC channel, like the conventional upstream channel operates in this mode to allow TDMA sharing of the available upstream bandwidth. Note for the data shown in FIG. 8, the QKD channel employed non-return-to-zero phase modulation and a continuous wave QKD source. The data shown in FIG. 7 was obtained using a pulsed QKD source. In the latter case, no phase encoding was employed, instead the results are just used to show the position of the quantum channel pulses relative to the modulated Raman generated by the conventional data channel.

Figure 9:
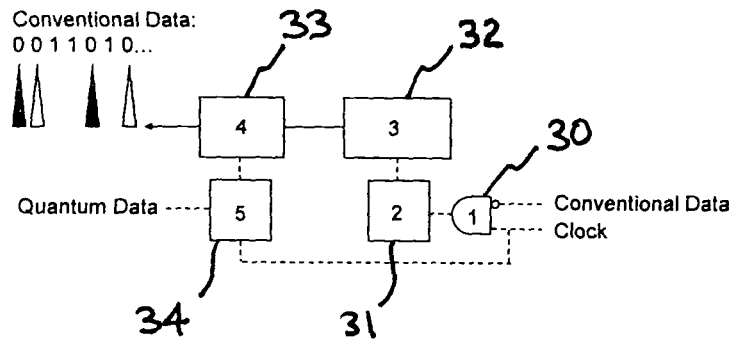
FIG. 9 illustrates how quantum channel bits, with low Raman-induced error probability, is only transmitted when a zero, or sequence of zeros, is transmitted on the conventional channel.
Figure 10:
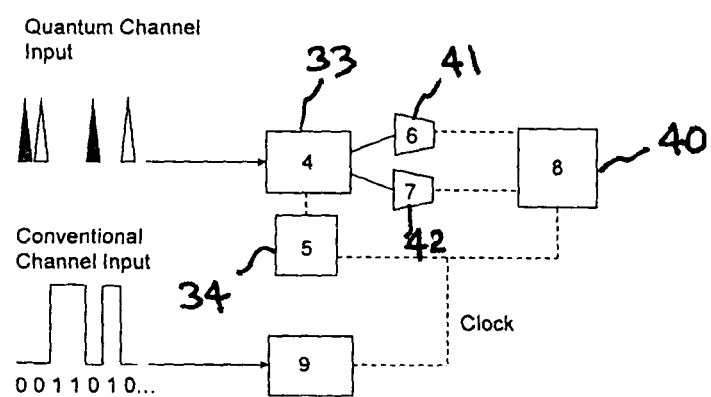
FIG. 10 illustrates conventional channel data and QKD channel data from FIG. 9 been received at a receiver.

In one mode of operation the invention provides time-synchronised transmission of data on the (polarisation or phase-modulated) QKD channel and the (on-off modulated) conventional channel such that a QKD bit is only transmitted when a zero, or sequence of zeros, is transmitted on the conventional channel. This can be achieved, for example, as shown in the transmitter embodiment shown in FIG. 9 by employing an AND gate (30). The AND gate (30) comprises an inverted input connected to a conventional channel clock and data sources. The two inputs of the AND gate (30) are driven by the system clock and the inverted conventional channel data, respectively. The output of the AND gate (30) is connected to a drive circuit (laser driver) (31) for the quantum channel source, which generates an optical output pulse only when a zero is present on the conventional data channel, for example using attenuated laser or single photon source (32). The quantum channel optical pulse is subsequently encoded with a quantum key bit using, for example, phase shift data encoding. An asymmetric Mach-Zehnder interferometer (33) and phase modulator (34) can be provided for phase encoding quantum key information The electrical drive circuitry also includes appropriate time delays (not shown) such that, when the quantum and conventional channels are optically multiplexed together at the transmitter output, there is hit alignment between the quantum and conventional data bits. This ensures that the quantum data pulses are substantially confined within the zero bit positions of the conventional data channel. FIG. 10 illustrates the data received at a receiver transmitted from FIG. 9 where only quantum bits are received at the receiver when there is a zero or zeros present transmitted and received on the conventional channel data. The quantum bits received at the receiver are detected by photon detectors and forms the raw key data, that can be processed to form the final shared secret key for use in a quantum key distribution system.

Figure 11:
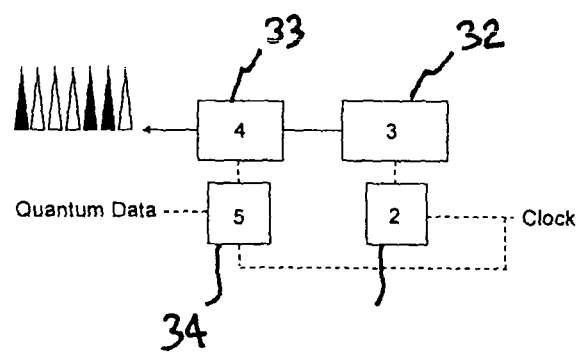
FIG. 11 illustrates conventional data and QKD channel transmitting together.
Figure 12:
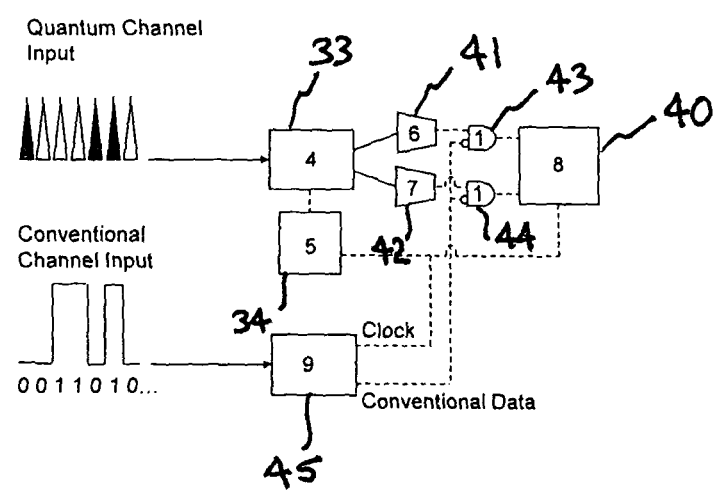
FIG. 12 illustrates how quantum channel bits with low Raman-induced error probability are post-selected directly at the receiver according to a second aspect of the invention.

In an alternative mode of operation the invention can be performed at a receiver as shown in FIGS. 11 and 12. FIG. 11 shows conventional data and QKD channel transmitting together without taking account of the Raman present. In this embodiment clock pulses generate a quantum channel pulse. Quantum channel bits with low Raman-induced error probability (instances where a zero was sent on the conventional channel) are post-selected directly at a receiver, as shown in FIG. 12. This is performed by providing a single photon detector for quantum channel 0 (41) and a Single photon detector quantum channel 1 (42). Time-correlated single photon data acquisition electronics (40), conventional data channel receiver with clock and data recovery (45), and a pair of AND gates (43, 44) are used with appropriate synchronisation and bit alignment such that the received data from the conventional channel gates the outputs from the single photon detectors such that quantum bits from the QKD are only registered by the data acquisition electronics (40) when there is a zero or zeros present on the conventional channel data. In this way bits that would have high error probability due to Raman cross-talk are excluded from the raw quantum key data. The quantum bits received at the receiver that are detected when the conventional channel is zero or zeros, forms the raw key data, that can be processed to form the final shared secret key for use in a quantum key distribution system.

It will be appreciated that the post selection described above and shown in FIG. 12 can be optionally performed in the public discussion phase of the QKD protocol.

In FIGS. 9 to 12 the dashed lines are electrical paths, solid lines are optical paths. The triangles represent quantum channel pulses carrying quantum key hits (open/shaded). It will be appreciated that the embodiments do not show clock and data time delays that are required to align the quantum and conventional data bits in the temporal domain.

It will be appreciated that there is time-synchronised transmission of data on the (polarisation or phase-modulated) QKD channel and the (on-off modulated) conventional channel such that a QKD bit is only transmitted when a zero, or sequence of zeros, is transmitted on the conventional channel. Also, there is co-directional propagation of the QKD and conventional channel. Further, there is dispersion management through wavelength selection or control of fibre properties such that the 'walk-off' in time of the QKD pulses and the Raman pulses generated by the ones on the conventional channel is less than or of the order of one bit period.

Also, the system may employ enhanced on-off extinction ratio of the conventional channel optical source compared to standard applications. This is dependent of the level of required Raman-suppression, which will vary from application to application.

In addition, and for practical convenience, the QKD channel may also be operated continuously so that quantum bits are also sent when data ones are present on the conventional channel. However, it is understood that in these time periods the quantum bits will have a high error probability due to high instantaneous Raman cross-talk and hence should be discarded during the post-transmission phase of the QKD protocol.

It will be appreciated that the invention can be employed by using software and electronic control schemes, including the development of control software for implementing the various stages of the QC communication protocol and also electronic components and modules for instrumentation control and synchronisation in order to bring the invention into effect.

The embodiments in the invention described with reference to the drawings comprise a computer apparatus and/or processes performed in a computer apparatus. However, the invention also extends to computer programs, particularly computer programs stored on or in a carrier adapted to bring the invention into practice to control the operation of the channels. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments described but may be varied in construction and detail.

The invention claimed is:

1. An optical communication system for secure data communication using quantum key distribution (QKD), comprising: a QKD data channel; a conventional data channel; a transmitter comprising means for transmitting data on said QKD data channel and said conventional data channel using a waveguide; and the transmitter performs time synchronisation to transmit a QKD data bit(s) on said QKD channel only when a zero or sequence of zeros is detected on the conventional data channel, such that cross-talk interference caused by Raman scattering is minimised.

2. An optical communication system as claimed in claim 1, wherein said time synchronisation comprises means for controlling alignment of bits in the conventional data channel and the QKD channel.

3. An optical communication system as claimed in claim 1 wherein said time synchronisation comprises means for controlling the alignment of bits in the conventional data channel and the QKD channel, said means for controlling the alignment comprises a common clock for the QKD and conventional data channels, said clock introduces time delays before transmission to guarantee bit alignment between the QKD and conventional data bits.

4. An optical communication system as claimed in claim 1 comprising means for increasing the on-off modulation extinction ratio of the conventional channel.

5. An optical communication system as claimed in claim 1, comprising means for increasing the on-off modulation extinction ratio of a conventional channel, wherein the modulation extinction ratio of a conventional channel is increased by modulating the drive current of a conventional channel laser between pre-determined high and low levels, which set the output optical powers for the one (on) and zero (off) states, respectively.

6. An optical communication system as claimed in claim 1, wherein the transmitter transmits the channels co-directionally.

7. An optical communication system as claimed in claim 1, wherein the system has optical characteristics such that walk-off in time of the QKD and conventional data channels is less than or of the order of one conventional channel bit period.

8. An optical communication system as claimed in claim 1, wherein the system has optical characteristics such that walk-ff in time of the QKD and conventional data channels is less than or of the order of one conventional channel bit period and wherein the transmission wavelength is at or close to a minimum for a group delay vs. wavelength characteristic curve for the waveguide.

9. An optical communication system as claimed in claim 1, wherein the system has optical characteristics such that walk-off in time of the QKD and conventional data channels is less than or of the order of one conventional channel bit period and wherein dispersion compensation components or systems are employed to reduce walk-off to the required level.

10. An optical communication system as claimed in claim 1, wherein the system has optical characteristics such that walk-off in time of the QKD and conventional data channels is less than or of the order of one conventional channel bit period and wherein the transmission wavelength is at or close to a minimum for a group delay vs. wavelength characteristic curve for the waveguide and wherein the wavelength is in the range of 1.2 to 1.65 µm.

11. An optical communication system as claimed in claim 1, wherein the system has optical characteristics such that walk-off in time of the QKD and conventional data channels is less than or of the order of one conventional channel bit period and wherein the transmission wavelength is at or close to a minimum for a group delay vs. wavelength characteristic curve for the waveguide and wherein the wavelength is selected at 1.3 µm.

12. An optical communication system as claimed in claim 1, wherein the system comprises coarse wavelength division multiplexers and de-multiplexers and/or other optical filters.

13. An optical communication system as claimed in claim 1, wherein the system is a multi-user passive optical network.

14. An optical communication system for secure data communication using quantum key distribution (QKD), comprising:
  a QKD data channel;
  a conventional data channel;
  a receiver comprising means for receiving data from said QKD data channel and
  said conventional data channel using a waveguide; and
  the receiver performs time synchronisation to receive data bits from said QKD channel and said conventional data channel, such that quantum channel bits are only detected by bit periods only when there is a zero or zeros on the conventional channel, wherein cross-talk interference caused by Raman scattering is minimised.

15. The optical communication system of claim 14 wherein the detected bits forms raw key data for providing said quantum key distribution.

16. A method of using quantum key distribution (QKD) for secure data communication in a communication system, comprising the steps of:
  providing a QKD data channel;
  providing a conventional data channel;
  transmitting data on said QKD data channel and said conventional data channel; and
  performing time synchronisation to transmit a QKD data bit(s) on said QKD channel only when a zero or sequence of zeros is detected on the conventional data channel, such that cross-talk interference caused by Raman scattering is minimised.

17. A method of using quantum key distribution (QKD) for secure data communication in a communication system, comprising the steps of:
  providing a QKD data channel;
  providing a conventional data channel;
  receiving data from said QKD data channel and said conventional data channel using a waveguide; and
  performing time synchronisation to receive data bits from said QKD channel and said conventional data channel, such that quantum channel bits are only detected by bit periods only when there is a zero or zeros on the conventional channel, wherein cross-talk interference caused by Raman scattering is minimised.

* * * * *